Jan. 6, 1925　　　　　　　　　　　　　　　　　1,522,124
C. H. HOISINGTON
TOOL SLIDE
Filed May 20, 1922　　　　2 Sheets-Sheet 1
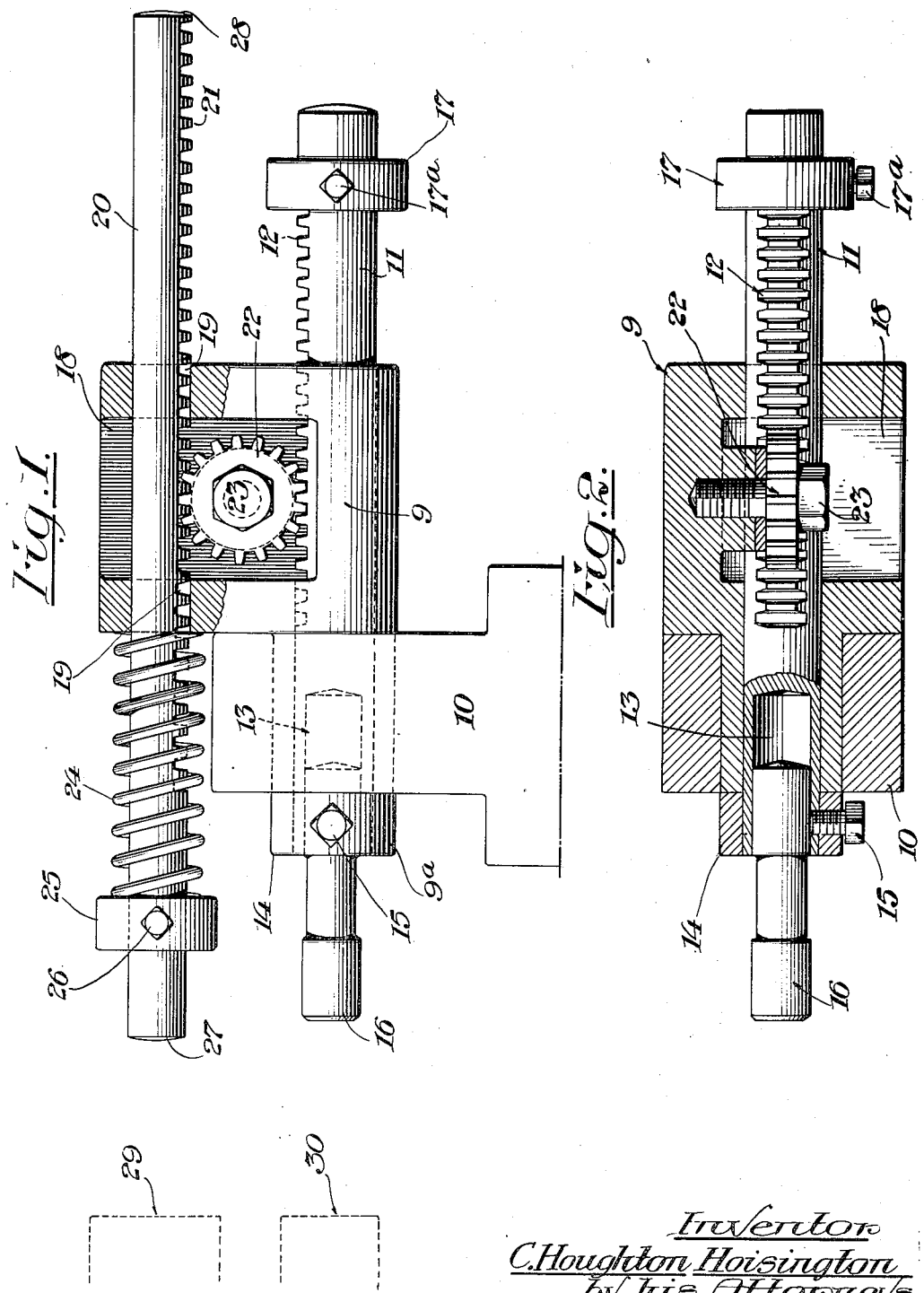
Inventor
C. Houghton Hoisington
by his Attorneys
Weed & Gray

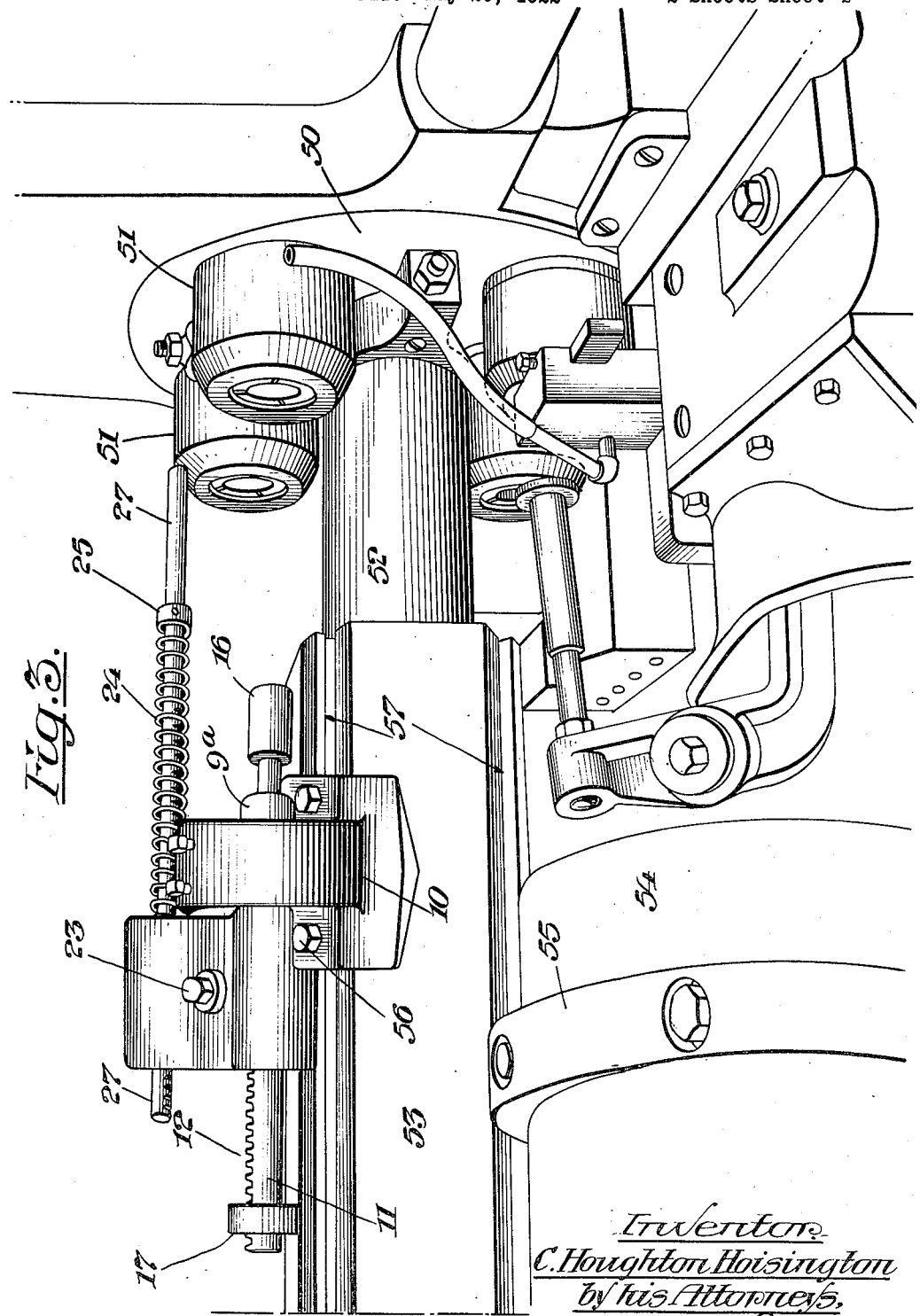

Patented Jan. 6, 1925.

1,522,124

UNITED STATES PATENT OFFICE.

CYRUS HOUGHTON HOISINGTON, OF WINDSOR, VERMONT, ASSIGNOR TO THE NATIONAL ACME COMPANY, OF CLEVELAND, OHIO, A CORPORATION OF OHIO.

TOOL SLIDE.

Application filed May 20, 1922. Serial No. 562,351.

*To all whom it may concern:*

Be it known that I, CYRUS HOUGHTON HOISINGTON, a citizen of the United States, residing at Windsor, in the county of Windsor and State of Vermont, have invented certain new and useful Improvements in Tool Slides, of which the following is a specification.

This invention relates to mechanism for varying or accelerating the speed or increasing the length of feed of working tools for various kinds of machines, such as metal working machines, and more particularly automatic screw machines, multiple spindle machines, etc., having usually a series of tool slide tools adapted to operate at the same time upon the work held in the several work spindles or work holders, an object of the invention being to provide a relatively simple, efficient, relatively economical and durable means for increasing the relative working stroke or feed of any of the working tools, or accelerate the speed of movement of the tool and work one relatively to the other, or to permit a working tool to have a greater feed, travel or movement than the tool slide.

Other objects of this invention will appear in the following description thereof, reference being had to the accompanying drawings forming a part of this specification, wherein like reference characters indicate corresponding parts in the several figures, and wherein Fig. 1 is a side elevation illustrating my invention; Fig. 2 is a view partly in section taken substantially along lines 2—2 of Fig. 1; and Fig. 3 is a perspective view illustrating a machine with an embodiment of my invention applied thereto.

Heretofore in various types of machines, such for instance as automatic screw machines, the several end working tools which are mounted upon the tool slide are adapted to approach simultaneously the work held in the several work spindles or other work holders, and at the same rate of speed regardless of their size or nature of the cut or work which they are to perform. Thus, the work stroke or feed of the several tools has been no greater than the travel of the tool slide, or in other words, the feed and stroke are limited to the slowest and longest single cut. Thus, it will be readily seen that it is often advantageous and advisable if possible, to increase either the speed or the length of feed of one of the tool slide tools, this being particularly true in the case of reamers for instance, which make a smoother and truer cut when moving or traveling at about twice the feed of a drill of corresponding diameter. Heretofore it has been found necessary to resort to rather complicated finishing slides, accelerating reaming attachments, etc. in order to accomplish these results, but the disadvantages of separate mechanism, particularly as to expense and loss of time, have been very great.

As a result of the present invention however, these disadvantages are absent and the present attachment or mechanism is readily adapted to the standard tool slide and is efficient and effective in operation.

Referring to Fig. 3 wherein by way of example an automatic multiple spindle machine is illustrated with the present improved attachment applied thereto, the machine in general may comprise a suitable indexing cylinder or turret 50 journaled in bearings in the frame of the machine, the cylinder having a plurality of work spindles 51 which carry the work. Extending axially from the cylinder 50 is a shaft or bearing 52 for slidably supporting the main tool slide 53. The cam shaft of the machine carries a cam drum 54 having a suitable cam 55 bolted thereto and in position to engage a suitable roller (not shown) carried by the tool slide 53 and to shift the same relatively to the work spindles. A further detailed description of the machine is not herein deemed necessary since the same may be constructed in accordance with Patent No. 904,866, dated Nov. 24, 1908, and assigned to the National Acme Company, assignee of the present invention.

The present attachment or mechanism comprises preferably a cast or flanged frame 9 having an extended bushing 9ª by means of which the frame may be placed and held in a standard tool holder 10, which is adapted to be bolted at 56 to the tool slide 53 of the machine. The tool slide is preferably of four-squared formation and is provided with dove tailed slots 57 for the reception of a plurality of tool holders, one only being herein shown. The frame and extended bushing are suitably bored to receive a tool holder rod or member 11, which may be formed of cold rolled steel and is provided with rack teeth 12 cut a suitable distance along the upper face thereof. The forward end of the tool holder rod 11 is bored as at 13 to receive a suitable working tool 16 held in position by means of a set screw 15 engaging the same and extending through the rod 11 and collar 14 at the outer end of the tool holder. It is obvious that any suitable tool holding means or chuck may be provided for holding the working tool. A gauge collar 17 may be located in position by means of a set screw 17ª adjacent the rear end of the rod 11.

The frame member 9 is provided with an opening or recess 18, and is also bored at 19 at opposite sides to form bearing holes for an operating rod 20. This rod or member may be of round cold rolled steel and is provided with rack teeth 21 along the under face thereof. Located in the recess 18 of the frame member, as by means of a suitable stud bolt or other pivot 23, is a pinion gear 22 adapted to mesh with the rack teeth 21 on the operating rod 20, and also with the teeth 12 on the tool holder rod 11. A compression or return spring 24 may be located in position on the rod 20 between the forward face of the frame member and a suitable collar 25 held in position by a set screw 26.

In operation of the device a reamer or other tool is placed in the chuck or other tool holding means at the forward end of the tool holder rod 11, and the operating rod 20 is so adjusted with relation to the gauge collar 25 that when the tool slide 53 carrying the several tools is shifted forwardly by the cam drum, the feed contact point 27 of the operating rod will strike some suitable stop 29 or other part of the machine such as the cylinder 50. As soon as this contact takes place, it will be seen that the operating rod 20 will be brought to a standstill, while the rest of the attachment continues to move forward. This will cause the pinion 22 to be revolved in a clockwise direction, thus causing the tool holder rod 11 to travel in the frame and relatively to the tool slide in the direction of the work 30 at twice the speed of the tool slide due to the multiplying gear 22. It will be seen furthermore, that the tool will also travel twice as far as the tool slide, and hence the present mechanism may be used for deep drilling and other work requiring a long throw or feed.

The feed contact point 27 of the operating rod is so set or adjusted that the proper depth is given to the cut of the tool 16. A second stop (not shown) is preferably placed somewhere on the frame of the machine, so that during the return movement of the tool slide the return contact point 28 of the operating or accelerating rod will strike the stop, thus positively withdrawing the tool by an action exactly opposite to the cutting stroke.

The return of the tool may be accomplished however, partly or wholly by means of the spring 24 or if desired, a compression spring such as spring 24, may be placed between the collar 17 and the rear face of the frame member 9 for the purposes of assisting and returning the tool. It will of course be understood that a combination of the spring and stop actions may be used for automatically causing the return of the tool after operation. It will be also understood that any preferred kind of tool 16 may be used, such as a drill, turning tool, burnishing tool, etc., where it is desired to obtain either a fast feed or an increased stroke.

In the construction shown in Fig. 1 a special stop 29 is provided for the rod 20. In Fig. 3 the rod 20 is of greater length and in this instance contacts with the face of cylinder 50. The length and position of the rod 20 may of course vary according to the nature of the work and the position of the stop therefor.

It will be understood that by describing in detail herein any particular form, structure, or arrangement, it is not intended to limit the invention beyond the terms of the several claims or the requirements of the prior art.

I claim as my invention:—

1. The combination of supporting means, a tool supported thereby, means for moving said supporting means and tool together relatively to the work, means for shifting said tool at a different speed than said supporting means, and means for operating said means and also for reversing the same.

2. The combination of a tool slide, a tool holder, means for moving the slide and tool holder together relatively to the work, gear means for shifting said tool holder at a different speed than said slide, and means for operating said gear means.

3. The combination of a tool slide, a tool carried thereby, means for shifting the slide and tool together relatively to the work, stop means, a member movable with said slide into engagement with said stop means, and means operated by said member and shiftably connected thereto and to said tool for shifting the tool relatively to the slide.

4. The combination of work supporting means, tool supporting means, a tool supported thereby, means for shifting the tool supporting means and work supporting means one relatively to the other at one speed, a member slidable endwise relatively to one of said supporting means at predetermined times, and means operated by said member for independently shifting the tool and work one relatively to the other.

5. The combination of work supporting means and tool supporting means, means for shifting one relatively to the other, a tool carried by said tool supporting means, an endwise shiftable member carried by said tool supporting means, and means operated by said member for accelerating the speed of movement of the tool relatively to the work during the operation of the tool on the work.

6. The combination of work supporting means, tool supporting means, a tool supported thereby, means for shifting the tool supporting means and work supporting means one relatively to the other at one speed, a member slidable endwise relatively to one of said supporting means at predetermined times, and a gear operated by said member for independently shifting the tool and work one relatively to the other.

7. The combination of work supporting means and tool holding means shiftable one relatively to the other, a tool carried by said tool holding means, means for accelerating the speed of movement of the tool and work one relatively to the other, said means including a gear cooperating with said tool holding means, and operating means therefor.

8. The combination of a tool slide, tool holding means shiftably carried thereby and movable with the slide during the entire movement of the slide, means for shifting the slide and thereby the tool holding means, means connected to the tool holding means for independently shifting the same, and reversible means for operating said means.

9. The combination of a tool slide, tool holding means shiftably carried thereby and having a series of teeth, means for shifting the slide and tool holding means, means for accelerating the speed of movement of said holding means, said means comprising a gear meshing with said teeth, and means for operating said gear.

10. The combination of a tool slide, tool holding means shiftably carried thereby and having a series of teeth, a gear meshing with said teeth, a rack meshing with said gear, means for shifting the slide and tool holding means, and means cooperating with said rack to permit acceleration of the speed of movement of said tool holding means.

11. The combination of a tool slide, tool holding means shiftably carried thereby, means for shifting the slide and tool holding means, means for accelerating the speed of movement of said tool holding means, said means comprising a pair of racks carried one by the tool holding means, a gear cooperating therewith, and stop means engaging one of said racks.

12. In a machine of the class described, the combination of a tool holding means, a tool carried thereby, cam means for moving the tool and work one relatively to the other, means for independently shifting the tool, and means operatively connected to said last means for operating the same in different directions.

13. In a metal working machine, the combination of a tool carrying support, tool holding means carried by said support and having a series of teeth, a gear cooperating with said teeth, and means for rotating said gear during the movement of the tool holding means relatively to the work for accelerating such movement.

14. The combination of work supporting means, tool holding means having a working tool, means for shifting one relatively to the other, a series of teeth carried by one thereof, a gear meshing with said teeth, and means for rotating said gear during the movement of the tool and work one relatively to the other.

15. The combination of work supporting means, tool supporting means, a working tool supported thereby, means for shifting one of said supporting means relatively to the other, stop means, means for independently shifting said tool and work one relatively to the other, and means cooperating at predetermined times with said stop means for operating said last means.

16. The combination of work supporting means, tool holding means having a working tool, means for shifting one relatively to the other, a series of teeth carried by one thereof, a gear meshing with said teeth, a toothed member cooperating with said gear, and means cooperating with said toothed member for accelerating the movement of the tool and work one relatively to the other.

17. The combination of shiftable supporting means, a pair of racks carried thereby and shiftable therewith, a gear cooperating with said racks, a tool controlled by one of said racks, and means for limiting the shiftable movement of one of said racks to increase the movement of the other rack.

18. The combination of supporting means, a pair of parallel racks carried thereby, a gear cooperating with said racks, a tool connected to one of said racks, and means for controlling one of the racks to permit shiftable movement of the other rack relatively thereto at increased speed.

19. The combination of supporting means, a pair of racks carried thereby, a gear cooperating with said racks, a tool connected to one of said racks, said last rack and said gear being movable relatively to the other rack to accelerate the movement of the tool.

20. In a machine of the class described, the combination of a sliding tool carrier, a tool carried thereby and movable constantly in accordance with the movement of said carrier, means operative during substantially the entire operation of the tool on the work for increasing the movement of the tool independently of the carrier, and means for reversing the operation of said last means.

21. The combination of work supporting means and tool holding means, means for shifting one relatively to the other, a tool carried by said tool holding means, means for accelerating the speed of movement of the tool and work one relatively to the other during the entire operation of the tool on the work, and means for reversing the operation of said last means.

22. The combination of a tool slide adapted to carry a plurality of tools, shiftable tool holding means carried by said slide, and means for shifting the tool holding means relatively to the slide at a greater speed during a predetermined movement thereof relatively to the work, said means including an operating member and a rotatable member controlled thereby and coacting with said tool holding means.

23. The combination of a tool support, a tool carried thereby, a shiftable rack, and a gear cooperating with said rack and tool support, means for limiting the movement of said rack, and means for shifting said support, tool, and gear together relatively to said rack.

24. The combination of a tool support, a pair of racks, one thereof connected to said support, a gear meshing with said racks, and means coacting with a rack for rotating said gear during the movement of the tool support.

Signed at Windsor, Vermont this sixteenth day of May, 1922.

CYRUS HOUGHTON HOISINGTON.